(12) United States Patent
Alsadun

(10) Patent No.: US 12,071,446 B1
(45) Date of Patent: Aug. 27, 2024

(54) METAL ORGANIC FRAMEWORKS CONTAINING FACE-CENTERED CUBIC TOPOLOGY SUPPORTED BY CARBON NANOTUBES

(71) Applicant: KING FAISAL UNIVERSITY, Al-Ahsa (SA)

(72) Inventor: Norah Alsadun, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/439,254

(22) Filed: Feb. 12, 2024

(51) Int. Cl.
| | |
|---|---|
| C07F 5/00 | (2006.01) |
| B01J 20/02 | (2006.01) |
| B01J 20/20 | (2006.01) |
| B01J 20/22 | (2006.01) |
| C02F 1/28 | (2023.01) |
| C02F 101/30 | (2006.01) |

(52) U.S. Cl.
CPC .............. C07F 5/00 (2013.01); B01J 20/0207 (2013.01); B01J 20/205 (2013.01); B01J 20/226 (2013.01); C02F 1/288 (2013.01); B01J 20/0259 (2013.01); C02F 2101/308 (2013.01)

(58) Field of Classification Search
None
See application file for complete search history.

(56) References Cited

U.S. PATENT DOCUMENTS

2018/0215771 A1    8/2018   Eddaoudi et al.

FOREIGN PATENT DOCUMENTS

| CN | 111346523 A | 6/2020 |
|---|---|---|
| WO | 20220168987 A1 | 8/2022 |

OTHER PUBLICATIONS

Lutton-Gething et al. (Chem. Mater. 2024, 26, 1957-1965). (Year: 2024).*
Vizuet et al. (JACS Comm, 2021, 143, 17995-1800). (Year: 2021).*
Viszuet Supplemental Information pp. 1-43. (Year: 2021).*

* cited by examiner

*Primary Examiner* — Clare M Perrin
(74) *Attorney, Agent, or Firm* — Nath, Goldberg & Meyer; Joshua B. Goldberg

(57) ABSTRACT

Metal-Organic Frameworks (MOFs) comprising an isoreticular series of MOFs based on face centered cubic (feu) topology. These MOFs can contain a rare earth metal (RE) located at the center and a ligand, for example, terephthalic acid or bipyridine and their extended forms. These MOFs can be combined with single walled carbon nanotubes (SWCNTs) to obtain a carbon nanotube (CNT)-metal organic framework (MOF) composite (CNT@MOF). This CNT@MOF is useful for, e.g., removing dyes from wastewater and can be tailored to meet the size of the dye to be removed.

19 Claims, No Drawings

METAL ORGANIC FRAMEWORKS CONTAINING FACE-CENTERED CUBIC TOPOLOGY SUPPORTED BY CARBON NANOTUBES

BACKGROUND

1. Field

The present disclosure provides an isoreticular series of Metal Organic Frameworks (MOFs) based on face-centered cubic (fcu) topology combined with carbon nanotubes. Such products can be useful for, e.g., dye removal.

2. Description of the Related Art

Industrial water waste includes a variety of dyes that should be removed as part of water treatment and purification which is vital for ensuring sufficient fresh water supply for basic needs. The incorporation of Metal-Organic Frameworks (MOFs) doped by carbon nanotubes have proven to increase the stability of the material in harsh conditions and in the presence of water. However, no reliable and cost-effective MOF solutions have yet been produced.

SUMMARY

The present subject matter relates to Metal Organic Frameworks (MOFs) comprising an isoreticular series of MOFs based on face-centered cubic (fcu) topology. These MOFs can contain a rare earth metal (RE) located at the center and a ligand, for example, terephthalic acid or bipyridine, and their extended forms. These MOFs can be combined with single-walled carbon nanotubes (SWCNTs) to obtain a carbon nanotube (CNT)-metal organic framework (MOF) composite (CNT@MOF). This CNT@MOF is useful for, e.g., removing dyes from wastewater and can be tailored to meet the size of the dye to be removed.

In an embodiment, the present subject matter relates to a method for making a metal organic framework (MOF) having face-centered cubic (fcu) topology, the method comprising: heating a solution comprising rare earth (RE) metal, an organic ligand, and 2-fluorobenzoic acid (2-FBA) in one or more solvents; cooling the solution to room temperature; and obtaining the metal organic framework having face centered cubic topology.

In another embodiment, the present subject matter relates to a metal organic framework (MOF) having face-centered cubic (fcu) topology prepared according to the methods described herein.

In a further embodiment, the present subject matter relates to a method of preparing a carbon nanotube (CNT)-metal organic framework (MOF) composite (CNT@MOF), the method comprising: immersing single-walled carbon nanotubes (SWCNTs) in dioxane to obtain a heterogenous mixture; sonicating the heterogenous mixture in an ultrasonic bath to obtain a dark suspension; adding the metal organic framework (MOF) having face-centered cubic (fcu) topology as described herein as colorless crystals to the dark suspension to obtain a resultant suspension; coating the SWCNTs on the colorless crystals in the resultant suspension to obtain a composite; purifying the composite to obtain a purified composite; mixing the purified composite with chloroform to obtain a first mixture; combining the mixture while stirring with a solution of poly(methyl methacrylate) (PMMA) to obtain a second mixture; sonicating the second mixture and drying the second mixture to obtain a thick paste; shaping the thick paste as pellets; and drying the pellets to obtain the carbon nanotube (CNT)-metal organic framework (MOF) composite (CNT@MOF).

In an additional embodiment, the present subject matter relates to a carbon nanotube (CNT)-metal organic framework (MOF) composite (CNT@MOF) prepared according to the methods described herein.

In one more embodiment, the present subject matter relates to a method of removing dye from wastewater, the method comprising: contacting the wastewater containing the dye with the carbon nanotube (CNT)-metal organic framework (MOF) composite (CNT@MOF) as described herein; and adsorbing the dye inside cavities of the carbon nanotube (CNT)-metal organic framework (MOF) composite (CNT@MOF), thereby removing the dye from the wastewater.

These and other features of the present subject matter will become readily apparent upon further review of the following specification.

DETAILED DESCRIPTION OF THE PREFERRED EMBODIMENTS

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to Metal Organic Frameworks (MOFs) comprising an isoreticular series of MOFs based on face centered cubic (fcu) topology. These MOFs can contain a rare earth metal (RE) located at the center and a ligand, for example, terephthalic acid or bipyridine and their extended forms. These MOFs can be combined with single walled carbon nanotubes (SWCNTs) to obtain a carbon nanotube (CNT)-metal organic framework (MOF) composite (CNT@MOF). This CNT@MOF is useful for, e.g., removing dyes from wastewater and can be tailored to meet the size of the dye to be removed.

In an embodiment, the present subject matter relates to a method for making a metal organic framework (MOF) having face centered cubic (fcu) topology, the method comprising: heating a solution comprising a rare earth (RE) metal, an organic ligand, and 2-fluorobenzoic acid (2-FBA) in one or more solvents; cooling the solution to room temperature; and obtaining the metal organic framework having face centered cubic topology.

These methods can be considered as solvothermal methods for preparing the MOFs. Such solvothermal methods can involve heating solutions containing lanthanide salts, organic linkers, and 2-FBA as a modulating agent, using a reticular method by simply modifying the reaction conditions to suit the solubility of ligands when changed for any of the feu MOFs.

In an embodiment of the present production methods, the metal organic framework having face centered cubic topology can be obtained as colorless polyhedral crystals. In this regard, the colorless polyhedral crystals can be washed to remove any excess of unreacted materials.

In certain embodiments, the rare earth metal can be a rare earth metal salt having a formula $RE(NO_3)_3 \cdot xH_2O$ selected from the group consisting of $Y(NO_3)_3 \cdot 6H_2O$, $(Ce(NO_3)_3 \cdot 6H_2O$, $La(NO_3)_3 \cdot 6H_2O$, $(Ce(NO_3)_3 \cdot 6H_2O$, $Tb(NO_3)_3 \cdot 5H_2O$, $Pr(NO_3)_3 \cdot 6H_2O$, $Nd(NO_3)_3 \cdot 6H_2O$, $Sm(NO_3)_3 \cdot 6H_2O$, $Eu(NO_3)_3 \cdot 5H_2O$, $Gd(NO_3)_3 \cdot 6H_2O$, $Dy(NO_3)_3 \cdot 6H_2O$, $Ho(NO_3)_3 \cdot 6H_2O$, $Er(NO_3)_3 \cdot 6H_2O$, $Yb(NO_3)_3 \cdot 6H_2O)$, $Lu(NO_3)_3 \cdot 6H_2O$, $Tm(NO_3)_3 \cdot 6H_2O$, and a combination thereof.

In other embodiments, the organic ligand can be selected from the group consisting of [1,1':4':1":4",1'''-quaterphenyl]-4,4'''-dicarboxylic acid; [1,1':4':1":4",1'''':4''',1''''-quinquephenyl]-4,4''''-dicarboxylic acid; 4"-(6-(4-carboxyphenyl)pyridine-3-yl-[1,1':4',1"-terphenyl]-4-carboxylic acid; 4'-(5'-(4-carboxyphenyl)-[2,2'-bipyridin]-5-yl)-[1,1'-biphenyl]-4-carboxylic acid; 2"-amino-[1,1':4',1":4",1':4',1'''-quinquephenyl]-4,4''''-dicarboxylic acid; 2"-methyl-[1,1':4', 1":4",1''':4''',1''''-quinquephenyl]-4,4''''-dicarboxylic acid; 2'-methyl-[1,1':4',1":4",1'''-quaterphenyl]-4,4'''-dicarboxylic acid; 2'-amino-[1,1':4',1":4",1'''-quaterphenyl]-4,4'''-dicarboxylic acid; 4'-(5-(4-carboxyphenyl)pyridine-2-yl)-[1,1'-biphenyl]-4-carboxylic acid; 4,4'-([2,2'-bipyridine]-5,5'-diyl)dibenzoic acid; 5'-(4'-carboxy-[1,1'-biphenyl]-4-yl)-[2,2'-bipyridine]-5-carboxylic acid; 6'-(4'-carboxy-[1,1':4',1"-terphenyl]-4-yl)nicotinic acid; and a combination thereof.

In additional embodiments, the one or more solvents can be selected from the group consisting of dimethyl formamide (DMF), deionized water ($H_2O$), dioxane, chloroform, acetone, and a combination thereof. In one embodiment in this regard, the one or more solvents can be a combination of DMF and deionized water.

In certain other embodiments of the present production methods, the step of heating the solution can be conducted to a temperature of about 110° C. to about 120° C., or about 115° C. In other embodiments in this regard, the heating of the solution can be conducted for about 50 hours.

In another embodiment, the present subject matter relates to a metal organic framework (MOF) having face centered cubic (fcu) topology prepared according to the methods described herein.

In this regard, the RE-fcu-MOF described herein can have a window size concept used for separating molecules from each other due to a defined window size which allows the passing of paraffin and prevents iso-paraffin passage. In certain embodiments, the MOFs can have a desired pore aperture size, for example, about 1 Å to about 40 Å, for example about 4.7 Å, and a more desirable relative rigidity in comparison to other MOFs such as ZIF-8, which allows the present MOFS, such as Y- and Tb-based feu-MOFs to exhibit a perfect cut-off aperture size for total n-paraffin/iso-paraffin separation.

The metal organic framework (MOF) having face-centered cubic (fcu) topology prepared herein can be designed, e.g., to match the size of dyes to be removed from wastewater and remove them accordingly. By way of non-limiting example, the present MOFs can include ligands with four or five phenyl rings, like [1,1':4':1":4",1'''-quaterphenyl]-4,4'''-dicarboxylic acid or [1,1':4':1":4",1''':4''',1''''-quinquephenyl]-4,4''''-dicarboxylic acid, having a window size of about 17 Å to about 20 Å, which is suitable for a variety of dyes falling below this number.

The RE-fcu-MOF as described herein can provide a unique high symmetry structure, capable of enclosing only equilateral triangular windows that are the sole access to the pore system, which contains two cages: tetrahedral cages decorating a central octahedral cage. The aperture size can easily be delimitated by the choice of an organic linker with a particular size and functionality. Accordingly, the construction of an isoreticular feu-MOF with a relatively larger linker will permit the anticipated expansion of the triangular window aperture, with a nominal expansion in the overall porosity, permitting the realization of the size diffusion of components with matching physical properties.

The feu topology of the present MOFs can, in certain embodiments, involve a structure having two accessible cavities and a singular rigid triangular window.

In a further embodiment, the present subject matter relates to a method of preparing a carbon nanotube (CNT)-metal organic framework (MOF) composite (CNT@MOF), the method comprising: immersing single-walled carbon nanotubes (SWCNTs) in dioxane to obtain a heterogenous mixture; sonicating the heterogenous mixture in an ultrasonic bath to obtain a dark suspension; adding the metal organic framework (MOF) having face centered cubic (fcu) topology as described herein as colorless crystals to the dark suspension to obtain a resultant suspension; coating the SWCNTs on the colorless crystals in the resultant suspension to obtain a composite; purifying the composite to obtain a purified composite; mixing the purified composite with chloroform to obtain a first mixture; combining the mixture while stirring with a solution of poly(methyl methacrylate) (PMMA) to obtain a second mixture; sonicating the second mixture and drying the second mixture to obtain a thick paste; shaping the thick paste as pellets; and drying the pellets to obtain the carbon nanotube (CNT)-metal organic framework (MOF) composite (CNT@MOF).

In certain embodiments of the CNT@MOF production methods, the sonicating of the heterogenous mixture can occur for about 30 minutes.

In other embodiments of the CNT@MOF production methods, the resultant suspension can be stirred at about 45° C. to about 55° C., or about 50° C., for about one day to coat the SWCNTs on the colorless crystals.

In further embodiments of the CNT@MOF production methods, the purifying of the composite can comprise washing the composite with acetone four times.

In additional embodiments of the CNT@MOF production methods, the carbon nanotube (CNT)-metal organic framework (MOF) composite (CNT@MOF) can be kept in hexane for at least four days so that the CNT@MOF can maintain its porosity.

In still other embodiments of the CNT@MOF production methods, sonicating the second mixture can occur for about 10 minutes and a flow of nitrogen can be used for drying the second mixture. Further, the drying of the pellets can occur in air.

In an embodiment, to shape the beads/pellets, the thick paste can be placed in an electric dough shaper (or pasta maker) to give the desired pellets that can be customized per need. In this regard, the beads/pellets can take a variety of sizes and shapes as needed.

In an additional embodiment, the present subject matter relates to a carbon nanotube (CNT)-metal organic framework (MOF) composite (CNT@MOF) prepared according to the methods described herein.

In one embodiment, the pore aperture size, rigidity, shaping, and enhanced water stability provided by the CNT@MOF can be adapted to fit any specific situation or set of materials desired.

In one more embodiment, the present subject matter relates to a method of removing dye from wastewater, the method comprising: contacting the wastewater containing the dye with the carbon nanotube (CNT)-metal organic framework (MOF) composite (CNT@MOF) as described herein; and adsorbing the dye inside cavities of the carbon nanotube (CNT)-metal organic framework (MOF) composite (CNT@MOF), thereby removing the dye from the wastewater. This adsorption process is considered as an efficient process due to its low cost, easy design, and ease of operation.

In this regard, the dye that can be removed is a water-soluble dye rather than a water-insoluble. In this regard, the water-soluble dye can be selected from the group consisting of ethyl violet, acid yellow 73, direct red 28, basic blue 9, Basic red 2 (BR2), known as safranin, Methyl blue, crystal violet, malachite green, Victoria Blue B, Basic Yellow 9, Pararosaniline, Brilliant Green, and a combination thereof.

In this regard, the CNT@MOF should have properties designed to match the specific dyes intended to be removed from the wastewater. To aid in the removal of water soluble dyes, the present CNT@MOFs can be designed to have a triangular window matching linear, bent, or triangular shapes and dimensions of the dye.

The present disclosure can be further understood by referring to the following examples.

EXAMPLES

Example 1

MOF Preparation

The synthetic procedure of preparing RE-fcu-MOFs involves combining an organic ligand (0.87 mmol), $RE(NO_3)_3 \cdot xH_2O$ (334 mg for $Y^{3+}$, 0.87 mmol), 2-FBA (1946 mg, 13.92 mmol), Dimethyl formamide-DMF (27 mL), and deionized $H_2O$ (7 mL), in a 150 mL round pressure vessel, which is sealed and heated to 115° C. for 50 h, then cooled to room temperature. Colorless polyhedral crystals will be seen at the bottom of the vessel, which will be washed thoroughly 3 times with DMF to remove any excess of the unreacted materials.

Cerium(III) Nitrate ($Ce(NO_3)_3 \cdot 6H_2O$) requires double the amount of the 2-FBA for synthesis.

Example 2

CNT@MOF Preparation

Pristine Single-Walled Carbon Nanotubes (SWCNTs) (5 mg) are immersed in 50 mL of dioxane. The heterogeneous mixture is sonicated in an ultrasonic bath for 30 minutes to get a dark suspension. Then, 100 mg of the prepared MOF are added. The resultant suspension is stirred in a shaker at 50° C. for 1 day in a 250 mL Schott glass bottle. The colorless crystals are expected to change their color due to the successful coating of CNT. The purification of the composite will be conducted by washing with acetone four times with 10 mL each time. To help the composite maintain its porosity the material will be kept in hexane for 4 days.

500 mg of the prepared composite will be added and mixed with 5 ml of chloroform, which then will be slowly combined while stirring with a stock solution of Poly(methyl methacrylate) (PMMA), prepared by adding 100 mg to 3 mL of chloroform ($CHCl_3$). The mixture will be sonicated for 10 minutes before drying the as-prepared mixture with a flow of Nitrogen. To shape the beads, the thick paste will be placed in an electric dough shaper (or pasta maker) to give the desired pellets that can be customized per need. Finally, it will be dried in air to provide the hardness and final shape of the CNT@MOF material.

It is to be understood that the methods and products are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A method for making a metal organic framework (MOF) having face centered cubic (fcu) topology, the method comprising:
   heating a solution comprising a rare earth (RE) metal, an organic ligand, and 2-fluorobenzoic acid (2-FBA) in one or more solvents;
   cooling the solution to room temperature; and
   obtaining the metal organic framework having face centered cubic topology;
   wherein the organic ligand is selected from the group consisting of [1,1': 4': 1": 4",1"'-quarterphenyl]-4,4"'-dicarboxylic acid; [1,1':1":4',1"':4"',1""-quinquephenyl]-4,4""-dicarboxylic acid; 4"(6-(4-carboxyphenyl)pyridine-3-yl-[1,1':4',1"-terphenyl]-4-carboxylic acid; 4'-(5'-(4-carboxyphenyl)-[2,2'-bipyridin]-5-yl)-[1,1'-biphenyl]-4-carboxylic acid; 2"-amino-[1,1':4',1":4",1"':4"',1""-quinquephenyl]-4,4""-dicarboxylic acid; 2"-methyl-[1,1':4',1":4",1"':4"',1""-quinquephenyl]-4,4""-dicarboxylic acid; 2'-methyl-[1,1':4',1":4",1"'-quaterphenyl]-4,4"'-dicarboxylic acid; 2'-amino-[1,1':4',1":4",1"'-quaterphenyl]-4,4"'-dicarboxylic acid; 4'-(5-(4-carboxyphenyl)pyridine-2-yl)-[1,1'-biphenyl]-4-carboxylic acid; 4,4'-([2,2'-bipyridine]-5,5'-diyl)dibenzoic acid; 5'-(4'-carboxy-[1,1'-biphenyl]-4-yl)-[2,2'-bipyridine]-5-carboxylic acid; 6'-(4'-carboxy-[1,1':4',1"-terphenyl]-4-yl)nicotinic acid; and a combination thereof.

2. The method of claim 1, wherein the metal organic framework having face centered cubic topology is obtained as colorless polyhedral crystals.

3. The method of claim 2, wherein the colorless polyhedral crystals are washed to remove any excess of unreacted materials.

4. The method of claim 1, wherein the rare earth metal is a rare earth metal salt having a formula $RE(NO_3)_3 \cdot xH_2O$ selected from the group consisting of $Y(NO_3)_3 \cdot 6H_2O$, $(Ce(NO_3)_3 \cdot 6H_2O$, $La(NO_3)_3 \cdot 6H_2O$, $Tb(NO_3)_3 \cdot 5H_2O$, $Pr(NO_3)_3 \cdot 6H_2O$, $Nd(NO_3)_3 \cdot 6H_2O$, $Sm(NO_3)_3 \cdot 6H_2O$, $Eu(NO_3)_3 \cdot 5H_2O$, $Gd(NO_3)_3 \cdot 6H_2O$, $Dy(NO_3)_3 \cdot 6H_2O$, $Ho(NO_3)_3 \cdot 6H_2O$, $Er(NO_3)_3 \cdot 6H_2O$, $Yb(NO_3)_3 \cdot 6H_2O)$, $Lu(NO_3)_3 \cdot 6H_2O$, $Tm(NO_3)_3 \cdot 6H_2O$, and a combination thereof.

5. The method of claim 1, wherein the one or more solvents are selected from the group consisting of dimethyl formamide (DMF), deionized water ($H_2O$), dioxane, chloroform, acetone, and a combination thereof.

6. The method of claim 5, wherein the one or more solvents are DMF and deionized water.

7. The method of claim 1, comprising heating the solution to about 110° C. to about 120° C.

8. The method of claim 7, wherein the heating the solution is conducted for about 50 hours.

9. A metal-organic framework (MOF) having face-centered cubic (fcu) topology prepared according to the method of claim 1.

10. A method of preparing a carbon nanotube (CNT)-metal-organic framework (MOF) composite (CNT@MOF), the method comprising:
    immersing single-walled carbon nanotubes (SWCNTs) in dioxane to obtain a heterogeneous mixture;
    sonicating the heterogenous mixture in an ultrasonic bath to obtain a suspension;
    adding the metal organic framework (MOF) having face centered cubic (fcu) topology of claim 9 as colorless crystals to the suspension to obtain a resultant suspension;
    coating the SWCNTs on the colorless crystals in the resultant suspension to obtain a composite;
    purifying the composite to obtain a purified composite;
    mixing the purified composite with chloroform to obtain a first mixture;
    combining the first mixture while stirring with a solution of poly(methyl methacrylate) (PMMA) to obtain a second mixture;
    sonicating the second mixture and drying the second mixture to obtain a paste,
    shaping the paste as pellets; and
    drying the pellets to obtain the carbon nanotube (CNT)-metal organic framework (MOF) composite (CNT@MOF).

11. The method of claim 10, wherein sonicating the heterogeneous mixture occurs for about 30 minutes.

12. The method of claim 10, wherein the resultant suspension is stirred at about 45° C. to about 55° C. for about one day to coat the SWCNTs on the colorless crystals.

13. The method of claim 10, wherein purifying the composite comprises washing the composite with acetone four times.

14. The method of claim 10, wherein the carbon nanotube (CNT)-metal organic framework (MOF) composite (CNT@MOF) is kept in hexane for at least four days so that the CNT@MOF maintains its porosity.

15. The method of claim 10, wherein sonicating the second mixture occurs for about 10 minutes and a flow of nitrogen is used for drying the second mixture.

16. The method of claim 10, wherein drying the pellets occurs in air.

17. A carbon nanotube (CNT)-metal organic framework (MOF) composite (CNT@MOF) prepared according to the method of claim 10.

18. A method of removing dye from wastewater, the method comprising:
    contacting the wastewater containing the dye with the carbon nanotube (CNT)-metal organic framework (MOF) composite (CNT@MOF) of claim 17; and
    adsorbing the dye inside cavities of the carbon nanotube (CNT)-metal organic framework (MOF) composite (CNT@MOF), thereby removing the dye from the wastewater.

19. The method of claim 18, wherein the dye is a water-soluble dye selected from the group consisting of Ethyl Violet, Crystal Violet, Acid Yellow 73, Basic Yellow 9, Direct Red 28, Methylene Blue, Victoria Blue B, Safranin, Pararosaniline, Brilliant Green, Malachite Green, and a combination thereof.

* * * * *